United States Patent
Gleichauf (10) Patent No.: US 8,595,817 B2
(45) Date of Patent: Nov. 26, 2013

(54) DYNAMIC AUTHENTICATED PERIMETER DEFENSE

(75) Inventor: Paul Gleichauf, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1615 days.

(21) Appl. No.: 11/497,613

(22) Filed: Aug. 1, 2006

(65) Prior Publication Data

US 2010/0257599 A1    Oct. 7, 2010

(51) Int. Cl.
*G06F 9/00* (2006.01)

(52) U.S. Cl.
USPC .......... 726/11; 726/1; 726/2; 726/26; 705/79; 709/238; 709/239; 709/240; 709/241; 709/242; 713/153; 713/154

(58) Field of Classification Search
USPC ................... 726/1–33; 705/79; 713/153, 154; 709/238–244
See application file for complete search history.

(56) References Cited

U.S. PATENT DOCUMENTS

| | | | |
|---|---|---|---|
| 7,055,173 B1* | 5/2006 | Chaganty et al. | 726/11 |
| 2002/0069356 A1* | 6/2002 | Kim | 713/160 |
| 2002/0091924 A1* | 7/2002 | Vlcan et al. | 713/168 |
| 2004/0260937 A1* | 12/2004 | Narayanan | 713/200 |
| 2005/0172146 A1* | 8/2005 | Yeung et al. | 713/200 |
| 2006/0271673 A1* | 11/2006 | Christodoulou et al. | 709/224 |
| 2007/0011272 A1 | 1/2007 | Bakke et al. | |

OTHER PUBLICATIONS

S. O'Sullivan et al., "Protecting Virtual Networks with a Distributed Cooperative Multi-layer Security Architecture," 2006 WSEAS Transactions, 2006, pp. 1-8.
Anonymous, "Telco Tech Network Security LiSS Series," Mar. 2007, pp. 1-2.
Anonymous, "Firewalls Complete—Types of Firewalls and Products on the Market," WindowSecurity.com, Oct. 16, 2002, pp. 1-100.

* cited by examiner

*Primary Examiner* — Taghi Arani
*Assistant Examiner* — Roderick Tolentino
(74) *Attorney, Agent, or Firm* — Hickman Palermo Truong Becker Bingham Wong LLP (57) ABSTRACT

Techniques for dynamically configuring security mechanisms in a network can construct security perimeters that satisfy security needs at any given time while also efficiently spreading security functions among network elements and systems. In one technique, a network element comprises security function modules. Systems toward which the network element forwards data packets also comprise security function modules. A particular security function module on the network element begins in a state of deactivation. The network element determines whether a corresponding security function module on one of the systems is functioning in a satisfactory manner. If not, then the network element activates the particular security function module. While activated, the particular security function module may perform at least some of the security function operations that the corresponding security function module would have performed if the corresponding security function module was satisfactory.

21 Claims, 3 Drawing Sheets

DYNAMIC AUTHENTICATED PERIMETER DEFENSE

FIELD OF THE INVENTION

The present invention generally relates to network security. The invention relates more specifically to techniques for dynamically configuring security mechanisms in a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In the past, network security sometimes has been implemented by deploying a plurality of static security perimeters around a protected computing system. These static security perimeters may be situated in a concentric manner, so that some of the perimeters completely surround others of the perimeters. One of the goals behind situating multiple perimeters concentrically in this manner is to maintain multiple lines of defense against security breaches. If an outer security perimeter is breached by a threat, then one or more inner security perimeters may yet protect the innermost computing system from the threat.

For example, a network-connected computer might execute virus protection software (referred to herein as "anti-virus software"). The anti-virus software continuously monitors the computer for the presence or arrival of viruses and seeks to eradicate any viruses detected. The anti-virus software may be viewed as a perimeter of defense surrounding the data and application programs stored on the computer. Additionally, the sole mechanism through which the computer receives data from the network might be a network router (simply referred to as a "router" herein) or firewall that examines data packets that are destined for the computer, and prevents data packets with certain specified characteristics from being forwarded on to the computer. The router may be viewed as another perimeter of defense surrounding the data stored on the computer. Still other additional defensive mechanisms may be situated beyond even the router.

Assuming that all of the defensive mechanisms work as planned, a virus must evade both the defensive mechanisms provided by the router and the defensive mechanisms provided by the anti-virus software before the virus can affect the data stored on the computer. Indeed, because the router might actually prevent a data packet that contains a virus from being forwarded on to the computer in the first place, some viruses might never even reach the anti-virus software. Because the router may eliminate some threats before those threats ever reach the anti-virus software, the router may be viewed as being part of an "outer" security perimeter, and the anti-virus software may be viewed as being part of an "inner" security perimeter that is completely surrounded by the "outer" security perimeter. If, for some reason, a virus evades the router, the virus still may be thwarted by the anti-virus software.

Concentrically situated security perimeters, such as those described in the example above, may be visualized as a series of walls and ramparts that concentrically surrounded a castle's keep in medieval times. Even if the castle's attackers breached the castle's outermost wall, the attackers would still need to breach one or more other inner walls surrounded by the outermost wall before the attackers could gain access to the innermost keep. Maintaining multiple concentric security perimeters provides greater security than a single perimeter by itself could provide.

As is discussed above, there may be some benefit in having a router inspect data packets before forwarding those data packets on toward computers that are connected to the router. Unfortunately, where many computers are connected to a router, and where the router receives data packets at a high rate and needs to forward those data packets on at a high rate, the router may have little time to inspect each data packet. Data packet inspection can be a computationally expensive task. Designing a router so that the router can inspect a sufficient number of data packets at a sufficiently high rate can significantly increase the monetary expense of the router.

One approach to reducing the expense of a router might entail omitting data packet inspection and other security functions from the router. As a result, the burden of security would fall entirely upon the computers toward which the router was forwarding data packets. This approach would lessen the workload on the router. This approach would also tend to divide the workload among multiple computers, so that each computer would carry less of a workload than the router otherwise would have carried.

However, under such an approach, if the security mechanisms on a particular computer failed, then that computer would be rendered at least partially defenseless against incoming threats. Under such an approach, there might be little or no redundancy or backup plan in the case of failure. Additionally, the individual computers might not be in a position to detect certain kinds of security threats that the router might have been able to detect and prevent by virtue of the router's position within the network and by virtue of the diverse information that passes through the router.

Based on the foregoing, there is a clear need for techniques that reduce the workload on network elements and also provide multiple layers of security to compensate for potential failure at a single layer.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Described herein are techniques for dynamically configuring security mechanisms in a network to construct security perimeters that satisfy security needs at any given time while also efficiently spreading security functions among network elements and systems. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Various embodiments of the invention are described herein according to the following outline:
1.0 General Overview
2.0 Structural and Functional Overview
3.0 Example Techniques
   3.1 Example Network States
   3.2 Example Remedial Actions
4.0 Implementation Mechanisms—Hardware Overview

1.0 General Overview

The needs identified in the foregoing Background, and other needs and objects that will become apparent for the following description, are achieved in the present invention, which comprises, in one aspect, a method for dynamically configuring security mechanisms in a network to construct multiple security perimeters that satisfy security needs at any given time while efficiently dividing security functions among network elements and systems.

According to one embodiment of the invention, a network element such as a switch, hub, or router comprises one or more security function modules. For example, a security function module might comprise a firewall that inspects selected incoming data packets and takes action relative to those data packets based on the contents and/or characteristics of those data packets. At any given time, each of these security function modules may be in a state of activation or deactivation. Some security function modules may be in a state of activation at the same time that other security function modules are in a state of deactivation. While a security function module is activated, that security function module performs specified security function operations. Conversely, while a security function module is deactivated, that security function module does not perform the specified security function operations.

According to such an embodiment of the invention, one or more systems toward which the network element forwards data packets also comprise one or more security function modules. For example, each computer to which the network element forwards data packets may comprise a separate firewall that inspects selected incoming data packets and takes action relative to those data packets based on the contents and/or characteristics of those data packets before allowing programs executing on that computer to receive those data packets.

According to such an embodiment of the invention, a particular security function module on the network element begins in a state of deactivation. During the course of the network element's operation, the network element determines whether a corresponding security function module on one of the systems discussed above is functioning in a satisfactory manner. If the network element determines that the corresponding security function module on the system is functioning in a satisfactory manner, then the network element continues to operate with the particular security function module in a state of deactivation, thereby sparing some of the network element's computational resources.

However, if the network element determines that the corresponding security function module is not functioning in a satisfactory manner, then, in such an embodiment of the invention, the network element responsively activates the particular security function module on the network element, thereby placing the particular security function module in a state of activation. While the particular security function module is in a state of activation, the particular security function module may perform at least some of the security function operations that the system's corresponding security function module would have performed if the system's corresponding security function module was functioning in a satisfactory manner. Thus, the network element may assume the protection of the system while the system is incapable of protecting itself.

According to one embodiment of the invention, while the particular security function module is in a state of activation, the network element determines whether the corresponding security function module that was previously determined to not be functioning in a satisfactory manner has resumed functioning in a satisfactory manner. If the network element determines that the corresponding security function module on the system has resumed functioning in a satisfactory manner, then, in such an embodiment of the invention, the network element responsively deactivates the particular security function module on the network element, thereby placing the particular security function module in a state of deactivation. The network element continues to operate with the particular security function module in a state of deactivation, thereby sparing some of the network element's computational resources.

Thus, at any given moment, security functions may be allocated dynamically among network elements and systems within a network in a manner that is both efficient and effective based on the current states of the network elements and the systems at that moment. By activating and deactivating security function modules at various network elements as is most appropriate under the circumstances, security function operations may be pushed toward or away from the entities that the security function operations are designed to protect.

This dynamic style of network defense may be compared to the dynamic manner in which soldiers might have protected the keep of a castle in medieval times. When invaders breached an outer wall of the castle, the soldiers might have temporarily retreated to an inner wall to make their stand against invaders. After the invaders had been repelled and the outer wall had been repaired, the soldiers might have returned to the outer wall to more effectively defend against future attacks.

In other aspects, the invention encompasses a computer apparatus and a computer-readable medium configured to carry out the foregoing steps. Various alternative embodiments of the invention are described in further detail below.

2.0 Structural Overview

Figure 1:
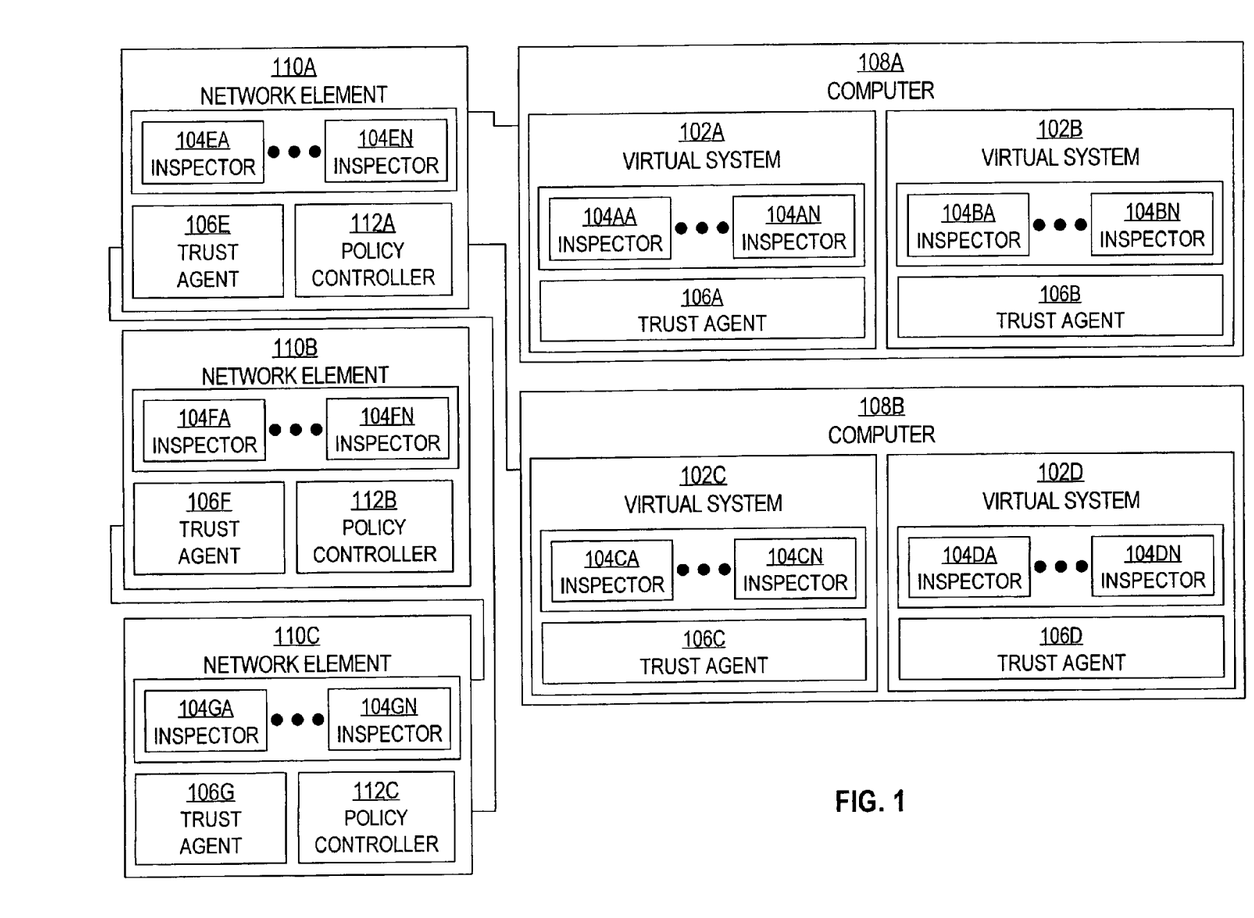
FIG. 1 is a block diagram that illustrates an overview of an example network environment in which embodiments of the invention may be implemented.

FIG. 1 is a block diagram that illustrates an overview of an example network environment in which embodiments of the invention may be implemented. The network environment illustrated is just one example of a network environment in which embodiments of the invention can be applied. Embodiments of the invention also can be applied in network environments that differ from the one discussed below.

The example network environment comprises computers 108A and 108B and network elements 110A-C. The network environment may additionally comprise other computers and network elements not shown in FIG. 1. Computers 108A and 108B are communicatively connected to network element 110A. Network elements 110A and 110B are communicatively connected to network element 110C. The connected components illustrated may communicate with each other by transmitting and receiving data packets through Ethernet ports, for example.

Network elements 110A-C may comprise any combination of infrastructure elements for a packet-switched network, such as switches, routers, hubs, load balancers, and/or other network elements. Network element 110C receives incoming data packets from a network. Network element 110C forwards data packets toward network elements 110A, 110B, and possibly other network elements not illustrated. Network element 110A receives data packets forwarded from network element 110C and forwards those data packets toward computers 108A, 108B, and possibly other computers not illustrated. Network element 110B also receives data packets forwarded from network element 110C and forwards those data packets toward other computers not illustrated.

Computers 108A and 108B may comprise any combination of servers, server blades, personal computers, workstations, and/or other computers. Computer 108A comprises virtual systems 102A and 102B. Computer 108B comprises virtual systems 102C and 102D. Each of virtual systems 102A-D utilizes an exclusive partition of the storage, memory, and computing resources of the computer on which that virtual system is hosted. For example, virtual system 102A may have exclusive use of a first subset of the CPU registers of computer 108A and virtual system 102B may have exclusive use of a second subset of the CPU registers of computer 108A. In this manner, each of virtual systems 102A-D may be completely separate from others of virtual systems 102A-D, so that operations performed in one such virtual system do not necessarily affect any of the other virtual systems. Different operating systems might execute on each of virtual systems 102A-D, for example.

Virtual system 108A comprises inspectors 104AA-AN. Virtual system 102B comprises inspectors 104BA-BN. Virtual system 102C comprises inspectors 104CA-CN. Virtual system 108D comprises inspectors 104DA-DN. Each inspector listed above may be a separate computer program, for example. Each such inspector is considered to be a separate security function module as described above in the foregoing General Overview. The inspectors listed above may comprise any combination of firewalls, anti-virus programs, pop-up blockers, spyware prevention software, adware prevention software, packet inspectors, and/or other security programs. Each inspector, when functioning properly, performs specified security function operations to protect the virtual system in which that inspector resides. For example, in one embodiment of the invention, inspectors 104AA-AN inspect data traffic that traverses the computers or network elements on which inspectors 104AA-AN reside, and take specified actions relative to suspicious or anomalous data traffic.

Virtual systems 102A-D additionally comprise trust agents 106A-D, respectively. Trust agents 106A-D may be implemented as computer programs that are executed by processors on computers 108A or 108B, for example. Each of trust agents 106A-D receives information from the inspectors that reside in same virtual system as that trust agent. The inspectors may proactively send the information to the trust agents, or the trust agents may periodically request the information from the inspectors. Additionally, in one embodiment, trust agents 106A-D act to anchor a chain of trust to the virtual systems 102A-D by determining that the virtual systems are in fact trusted. In an embodiment, trust agents 106A-D use cryptographic methods in software, hardware, firmware or a combination thereof, to assure the integrity of the local virtual system, the unambiguous identification of that system, and protection of communications. Communications may be protected, for example, using integrity checks on transmitted data, encryption of such data, or other approaches. Each trust agent 106A-D enables other systems, such as network elements 110A-C, to project their defensive perimeters onto the computer systems 108A, 108B with the assurance that the computer systems can be trusted to fulfill their roles.

In an embodiment, if trust is compromised, either by a local trust agent 106A-D detecting that it has been compromised or detecting that components it is protecting (such as the virtual systems or computer systems 108A, 108B) have been compromised, or if other trust agents in other systems detect its compromise, then a signal is triggered and the trust boundary shifts to compensate. In an embodiment, other trust agents in other systems can detect that the trust agents or protected systems are comprised using a "tattle-tale" protocol implemented in a network interface card (NIC), or similar protocols. Detecting that security has been compromised may occur at the behavioral level of a system, for example, detecting that a system or process is performing inappropriate system calls, not reacting to probes and making appropriate measurements, etc.

The information that the trust agents receive may indicate abnormalities or threats that the inspectors have detected. Additionally or alternatively, the information or the lack thereof from a particular inspector may indicate that the particular inspector is not functioning properly or in a satisfactory manner. The information or the lack thereof may indicate that the particular inspector can no longer be trusted to perform the security function operations for which the particular inspector is responsible. For example, if trust agent 106A requests information from inspector 104AA and inspector 104AA does not respond in a timely manner, then the lack of a timely response from inspector 104AA may indicate that inspector 104AA has ceased functioning properly.

Trust agents 106A-D correlate the information received from the inspectors and send that correlated information to policy controller 112A on network element 110A. Policy controller 112A may be implemented as a program executed by one or more processors on network element 110A, for example. Based on the information received from trust agents 106A-D, policy controller 112A authorizes an action in the network. For example, trust agent 106E in network element 110A may receive trust measurements from one or more other trust agents, and may determine that a particular trust agent (e.g., trust agent 106A) is not functioning in a trustworthy manner. Based on the information received from trust agent 106E about trust agent 106A, policy controller 112A may authorize an action, such as informing the trust agent 106E to ignore any further assertions from trust agent 106A until that trust agent become trustworthy. In an embodiment, policy controller 112A provides rules for actions that it or related components (for example switch ports) implement to control traffic or signal problems to other elements in the network, including other such controllers.

Policy controller 112A is configured to take one or more specified actions in response to determining that a particular inspector is not functioning in a satisfactory (e.g., defined) manner, or in response to determining that other specified events have occurred in the network. For example, policy controller 112A may take actions in response to determining that a particular inspection has halted or terminated. For another example, policy controller 112A may take actions in response to determining that suspicious data traffic is passing through a portion of the network. For another example, policy controller 112A may take actions in response to determining that that some program is performing suspicious operations (e.g., attempting to access resources which a program of that type normally should not access). For another example, policy controller 112A may take actions in response to determining that an unidentified or unregistered device has been connected to the network.

Policy controller 112A may consult a stored policy specification in order to determine the nature of the action that should be taken in response to a determination that a particular inspector is not functioning in a satisfactory manner or that a security threat is present within the network. For example, in response to a determination that inspector 104AA is not functioning in a satisfactory manner, policy controller 112A may determine a set of security function operations that inspector 104AA is supposed to perform. Policy controller 112A may determine a minimum set of inspectors 104EA-104EN (on network element 110A) which can perform some or all of the security function operations in the determined set of security function operations. Policy controller 112A may activate each of the inspectors in the determined set of inspectors.

Like inspectors 104AA-104DN, each of inspectors 104EA-EN may be a separate computer program. Each such inspector is considered to be a separate security function module as described above in the foregoing General Overview. Again, the inspectors may comprise any combination of firewalls, anti-virus programs, packet inspectors, and/or other security programs.

Initially, inspectors 104EA-104EN might be in a state of deactivation. For example, inspectors 104EA-EN might be computer programs which are stored on network element 110A but not yet executed. Network element 110A may activate certain ones of inspectors 104EA-EN by executing the computer programs that implement those inspectors, for example, in response to a determination that security function operations that those inspectors perform are not currently being performed by any inspectors on a particular virtual system.

When policy controller 112A activates certain ones of inspectors 104EA-EN, it may allow certain others of inspectors 104EA-EN to remain in a state of deactivation. According to one embodiment of the invention, the activated inspectors may be configured to perform security function operations on behalf of those of inspectors 104AA-DN which currently are not functioning in a satisfactory manner, but not on behalf others of inspectors 104AA-DN which currently are functioning in a satisfactory manner.

For example, if policy inspector 112A determines that inspector 104AA is not currently functioning in a satisfactory manner, then policy inspector 112A may activate and/or configure inspector 104EA to perform at least some of the security function operations that inspector 104AA was supposed to perform. For example, if inspector 104AA was a firewall that inspected all data packets that arrived at virtual system 102A, then inspector 104EA might also be a firewall that inspects all data packets that are destined for virtual system 102A, in which inspector 104AA resides.

However, under such circumstances, policy inspector 112A might configure inspector 104EA to refrain from inspecting data packets that are destined for virtual systems 102B-D, since the information received from trust agents 106B-D might indicate that the inspectors residing in virtual systems 102B-D are currently inspecting the data packets that arrive at virtual systems 102B-D. By only activating the minimum set of inspectors 104EA-EN necessary to compensate for the shortcomings of specific ones of inspectors 104AA-DN, policy 112A conserves the computing resources of network element 110A and spreads the burden of providing security among multiple components of the network environment (i.e., virtual systems 102A-D).

After one or more of inspectors 104EA-EN have been activated, trust agents 106A-D may continue to receive information from inspectors 104AA-DN. The information received may indicate that an inspector which previously was not functioning in a satisfactory manner has resumed operating in a satisfactory manner. For example, after the passage of some time interval in which trust agent 106A did not receive any information from inspector 104AA, trust agent 106A might once again receive information from inspector 104AA. Trust agent 106A may forward this information toward policy controller 112A on network element 110A.

In response to a determination that a particular inspector, which was previously determined to not be functioning in a satisfactory manner, has resumed functioning in a satisfactory manner, policy controller 112A may deactivate those of inspectors 104EA-EN which policy controller 112A previously activated to compensate for the particular inspector's failure to perform specific security function operations.

For example, if policy controller 112A previously activated inspectors 104EA and 104EB in response to determining that inspector 104AA was not performing specific security function operations, then, in response to determining that inspector 104AA has resumed performing those specific security function operations, policy controller 112A may deactivate inspectors 104EA and 104EB while leaving others of activated inspectors 104EA-EN in an activated state. By deactivating, on network element 110A, inspectors which no longer need to compensate for previously untrustworthy inspectors in virtual systems 102A-D, policy controller 112A conserves the computing resources of network element 110A.

According to one embodiment of the invention, the dynamic redundant techniques described above extend to multiple levels within a hierarchy of network elements. For example, in the same manner that trust agents 106A-D receive information from inspectors 104AA-DN and send that information to policy controller 112A, trust agent 106E (on network element 110A) may receive information from inspectors 104EA-EN and send that information to policy controller 112C (on network element 110C). Likewise, trust agent 106F (on network element 110B) may receive information from inspectors 104FA-FN (also on network element 110B) and send that information to policy controller 112C.

In the same way that policy controller 112A may activate certain ones of inspectors 104EA-EN to compensate for untrustworthy inspectors among inspectors 104AA-DN, policy controller 112C may activate certain ones of inspectors 110GA-GN (on network element 110C) to compensate for untrustworthy inspectors among inspectors 104EA-FN. Furthermore, in the same way that policy controller 112A may deactivate certain ones of inspectors 104EA-EN in response to determining that corresponding previously untrustworthy inspectors among inspectors 104AA-DN have resumed functioning in a satisfactory manner, policy controller 112C may deactivate certain ones of inspectors 104GA-GN in response to determining that corresponding previously untrustworthy inspectors among inspectors 104EA-FN have resumed functioning in a satisfactory manner.

In the illustrated embodiment, network element 110C also comprises trust agent 106G, which receives information from inspectors 104GA-GN and sends that information to yet another policy controller (not illustrated) on yet another network element (not illustrated). Thus, there may be several levels of dynamically provided redundancy among security mechanism in the network environment.

As various inspectors are activated and deactivated as needed in response to events that occur in the network environment, security perimeters essentially expand and contract dynamically about virtual systems 102A-D. Through the dynamic activation and deactivation of inspectors on the network elements, security functions essentially "move" farther away from or closer to virtual systems 102A-D to compensate for existing and changing circumstances in the network environment.

Further, in an embodiment, as security functions move upwardly in a network that is logically organized as a tree or hierarchy, more traffic can be observed at higher layers. Consequently, to prevent the sheer volume of observed traffic from overwhelming inspection elements, at higher levels inspection elements may use less thorough monitoring, for example, using selectively sampled traffic. However, as more trust agent signals can be monitored, distributed misbehavior can be correlated and acted upon more effectively. Various embodiments may implement tradeoffs of these issues in different ways. For example, if more primitive inspection functions are performed at lower levels of the hierarchy, then more global inspection and correlation can usefully be done at higher levels.

3.0 Example Techniques

Figure 2:
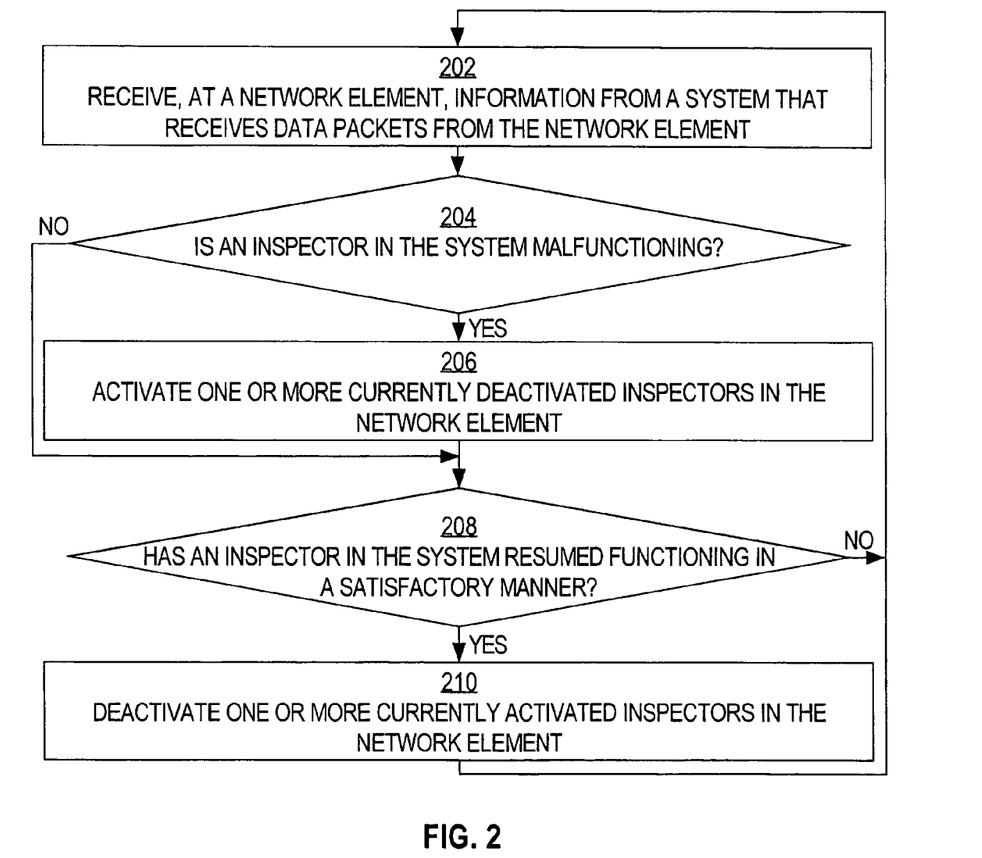
FIG. 2 is a flow diagram that illustrates an example of a technique for dynamically configuring security mechanisms to compensate for events that transpire in a network environment.

FIG. 2 is a flow diagram that illustrates an example of a technique for dynamically configuring security mechanisms to compensate for events that transpire in a network environment. The technique may be performed by any of network elements 110A-C, or, more specifically, by any of policy controllers 112A-C, for example. The technique described is just one example of an embodiment of the invention. Other techniques according to alternative embodiments of the invention may omit steps described below or include steps not expressly described below. The steps described below with reference to FIG. 2 are further explained by specific examples which involve structures and mechanisms described above with reference to FIG. 1.

In block 202, information from a system that receives data packets from a network element is received at the network element. As used herein, the term "system" includes both computers and network elements such as switches, routers, hubs, load balancers, etc. For example, policy controller 112A on network element 110A may receive information from trust agent 106A on computer 108A.

In block 204, based on the information received in block 202, a determination is made as to whether a particular previously functioning inspector in the system is not functioning in a satisfactory (e.g., defined) manner. This determination may be made relative to each previously functioning inspector in the system, but is described herein with reference to a single inspector for sake of simplicity and ease of understanding.

For example, based on the information received from trust agent 106A, policy controller 112A may determine whether inspector 104AA is functioning in a satisfactory manner. In response to a determination that the particular inspector is not functioning in a satisfactory manner, control passes to block 206. Alternatively, in response to a determination that the particular inspector is functioning in a satisfactory manner, control passes to block 208.

In block 206, one or more currently deactivated inspectors in the network element are activated. According to one embodiment of the invention, the inspectors which are activated are the fewest in number which are capable of providing all (or as many as possible) of the security function operations that should have been performed by the particular inspector. This approach effectively balances the issues of scale described at the end of section 2.0 above. In an embodiment, as the security perimeter moves to higher levels, the lower level or more primitive, or just simply offloaded, inspection functions may migrate upwards, with consequences for performance or accuracy. Similarly an excess of events needing inspection at a lower level of defense may require offloading of a subset of such events to another system.

For example, in response to a determination that inspector 104AA is not currently functioning in a satisfactory manner, policy controller 112A may activate inspectors 104EA and 104EB to perform at least some of the security function operations that inspector 104AA would have performed if inspector 104AA was currently functioning in a satisfactory manner. In so doing, policy controller 112A may leave other currently deactivated inspectors in a state of deactivation because their functionality is not currently needed. Control passes to block 208.

In block 208, based on the information received in block 202, a determination is made as to whether a particular previously malfunctioning inspector in the system has resumed functioning in a satisfactory (e.g., defined) manner. As used herein, the term "malfunctioning" includes the meaning "non-functioning." This determination may be made relative to each previously malfunctioning inspector in the system, but is described herein with reference to a single inspector for sake of simplicity and ease of understanding.

For example, based on the information received from trust agent 106A, policy controller 112A may determine whether a previously malfunctioning inspector 104AB has resumed functioning in a satisfactory manner. In response to a determination that the particular inspector has resumed functioning in a satisfactory manner, control passes to block 210. Alternatively, in response to a determination that the particular inspector is still not functioning in a satisfactory manner, control passes back to block 202, wherein the technique repeats.

In block 210, one or more currently activated inspectors in the network element are deactivated. According to one embodiment of the invention, the inspectors which are deactivated are the same inspectors which were activated in response to the previous determination that the particular inspector was not functioning in a satisfactory manner, excluding any currently active inspectors which are performing security function operations for other currently malfunctioning inspectors (a particular inspector on a network element might be performing security function operations on behalf of multiple malfunctioning inspectors—even inspectors on different systems).

For example, in response to a determination that previously malfunctioning inspector 104AB has resumed performing security function operations in a satisfactory manner, policy controller 112A may deactivate inspectors 104EC and 104ED, which policy controller had previously activated in response to determining that inspector 104AB was malfunctioning.

After the operations of block 210 have been completed, control passes back to block 202, wherein the technique repeats.

3.1 Example Network States

According to one embodiment of the invention, a network trust perimeter extends into a CPU cluster. This means that monitoring signals, collected from the CPU cluster from the trust agents and inspectors, can be interpreted and acted upon within the CPU cluster. Actions performed in response to the signals generally involve some kind of policy. The policy may be a security, management, or service localization policy, for example. Inspectors watch for traffic anomalies or other service-related changes of state. Trust agents receive inspection information and determine whether a particular system is trustworthy or has been compromised, and report trustworthiness information to a policy controller. As a result, the trust perimeter of network elements can be extended to other systems. In one embodiment of the invention, as long as patterns are normal, the network trust perimeter remains as the perimeter was when the perimeter was initialized.

In one embodiment of the invention, the initial state of a network trust perimeter changes from an initial state, $S(0)$, to another state, S(i), in response to agents' detections of the occurrences of various events.

In one embodiment of the invention, the current state transitions to a state S(1) when one or more cooperating applications, executing on CPUs in the CPU cluster, have been compromised.

In one embodiment of the invention, the current state transitions to a state S(2) when one or more host operating systems executing on one or more such CPUs have been compromised. The compromise of the host operating systems may be detected by agents executing within the operating system, or by data traffic-monitoring agents located outside of the CPU cluster—for example, agents residing on a switch or other network element.

In one embodiment of the invention, the current state transitions to a state S(3) when one or more software agents, executing on CPUs in the CPU cluster, have been compromised. The compromise of these agents may be detected by the peers of those agents or by agents residing on switches or other network elements.

In one embodiment of the invention, the current state transitions to a state S(3) when one or more software agents, executing on CPUs in the CPU cluster, have been compromised. The compromise of these agents may be detected by the peers of those agents or by agents residing on switches or other network elements.

In one embodiment of the invention, the current state transitions to a state S(4) when agents residing on a switch or other network element have been compromised. The compromise of these agents may be detected by agents residing on other network elements (e.g., network elements higher up in the hierarchy of network elements), and/or by monitors located within the CPU cluster. Monitors located within the CPU cluster might detect the compromise of switch-based agents by inspecting data traffic that flows through the switch through which the data traffic resides, for example.

3.2 Example Remedial Actions

According to one embodiment of the invention, if a significant anomaly or problem is detected, then a policy controller located on a network element may responsively restrict traffic patterns within and in and out of the CPU cluster. Some of the actions that a policy controller might take include: (1) migrating, into the network, services that were being provided in the CPU cluster; (2) patching software programs using admission control (this may be a binary decision—admit or quarantine—between two sub-networks); (3) terminating and restarting affected or compromised software; (4) limiting the rate of flow of certain specified classes of data traffic so that these classes can be more thoroughly inspected and managed, or splitting data traffic into sub-networks, thereby restricting available traffic paths for certain specified classes of data traffic; (5) migrating policy enforcement functions from an endpoint or edge switch toward a next interior "hop" that is better equipped to correlate attack-related or other information from a larger portion of the network; and (6) migrating encryption and connection termination points to other network elements to provide for better inspection and monitoring of suspicious data traffic—such a measure might be taken especially when the suspicious data traffic is not known to be so harmful as to completely shut down or shunt the network or a portion thereof.

The specific actions that the policy controller performs may vary according to the logical location in a network hierarchy of a security perimeter. For example, if the policy controller is receiving trustworthiness information based on inspection of traffic at a high hierarchical level, then the policy controller may perform more global correlation and may issue instructions or perform actions for a larger number of network elements.

According to one embodiment of the invention, when an agent determines that the threat which caused one of the above actions to be performed has passed (which may be accompanied by a change of network state, as described above), an inverse process is performed so that security and/or other functions which were previously migrated away from the CPU cluster toward the network core are migrated back toward the CPU cluster or network edge.

Some of the above actions may be performed in response to the entrance of certain network states. Some actions might not be required when certain network states are entered. For example, in response to the entrance to state S(1), described above, the migration of policy enforcement functions might not be necessary or desirable. Specified combinations of actions may be performed in response to the entrance of certain network states.

According to one embodiment of the invention, the transition into some network states does not lead to a change in the network trust perimeter under normal policy configurations. For example, if the operating is only running applications, but not the network stack, then a transition into state S(2) described above might be not lead to a change in the network trust perimeter.

In certain embodiments of the invention, certain circumstances may require the movement of the network trust perimeter. For example, when an application that was encrypting data traffic is determined to be compromised or becomes suspect, then the movement of the network trust perimeter may be necessary, but the migration of the policy enforcement point might be unnecessary. Under such circumstances, policy may be enforced to move the encryption function onto a switch or other network element so that data traffic can be inspected until the suspicious application can be verified, rehabilitated, or replaced. Alternatively, the encryption endpoint can be migrated to a switch node for inspection and re-encryption. For another example, when an agent is compromised, or when a network stack is compromised, appropriate actions may include the termination of the compromised agent and the movement of the policy enforcement point to a different network element, and the repair or replacement of the compromised agent, followed by the restarting of the agent and, optionally, the returning of the policy enforcement point to its original location.

4.0 Implementation Mechanisms—Hardware Overview

Figure 3:
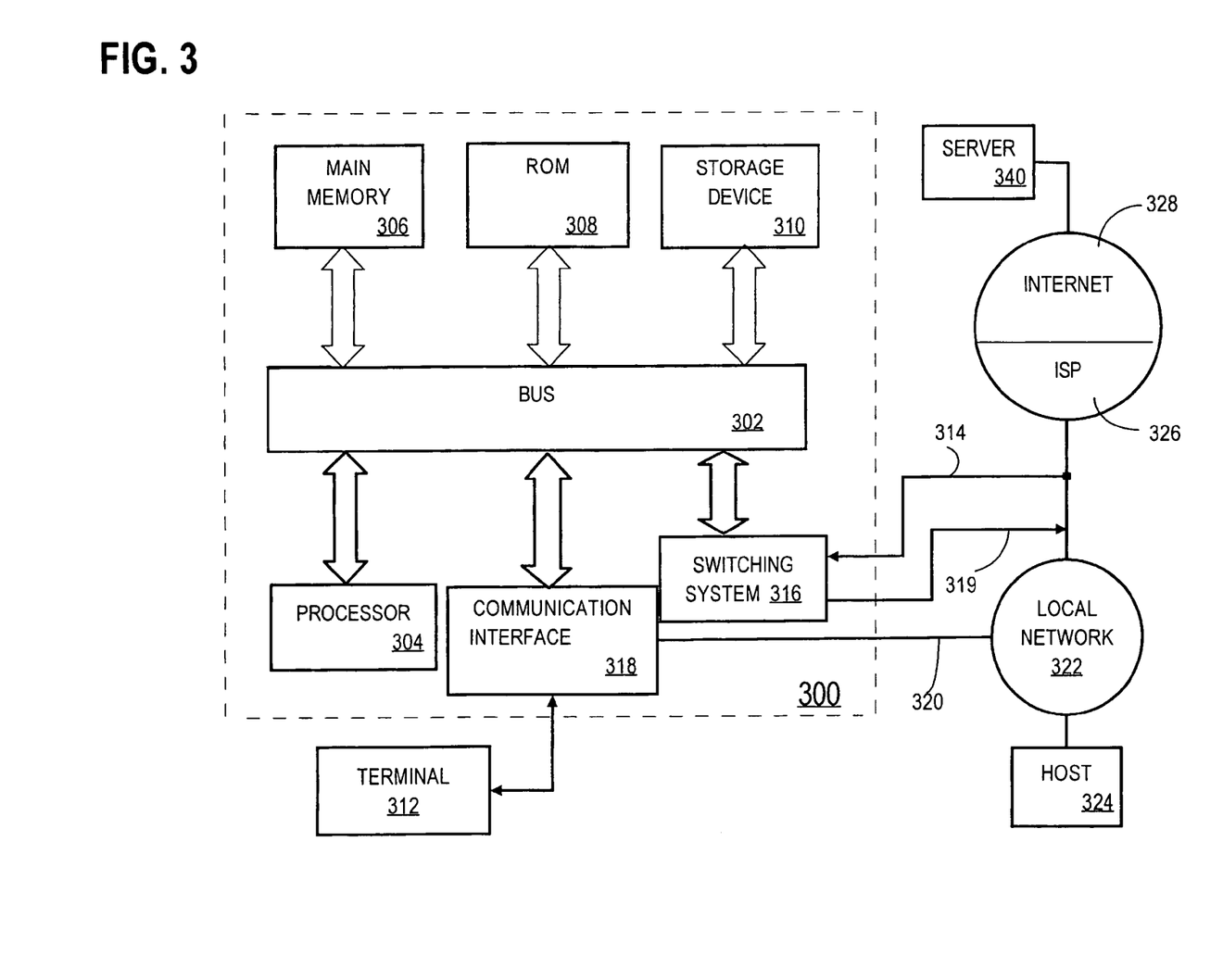
FIG. 3 is a block diagram that illustrates a computer system upon which an embodiment may be implemented.

FIG. 3 is a block diagram that illustrates a computer system 300 upon which an embodiment of the invention may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-622 interface. An external terminal 312 or other computer system connects to the computer system 300 and provides commands to it using the interface 618. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The invention is related to the use of computer system 300 for switching transport protocol connection keys. According to one embodiment of the invention, approaches for switching transport protocol connection keys are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for switching transport protocol connection keys as described herein.

Processor 304 may execute the received code as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    determining, at a network element, at a first time, that a first system other than the network element has stopped providing one or more security functions that were previously provided by the first system for network traffic that traverses at least the network element and the first system; and
    in response to a determination that the first system has stopped providing the one or more security functions, the network element automatically activating a security mechanism that provides at least one of the one or more security functions for network traffic that traverses at least the network element and the first system, wherein the security mechanism was in a state of deactivation in the network element prior to the first time;
    wherein the security mechanism is deactivated when the first system resumes providing the one or more security functions;
    wherein the security mechanism is stored on the network element;
    wherein the method is performed by the network element.

2. A method as recited in claim 1, further comprising:
    determining, at the network element, at a second time that is later than the first time, whether the first system is currently providing the at least one of the one or more security functions for network traffic that traverses at least the network element and the first system; and
    in response to a determination that the first system is currently providing the at least one of the one or more security functions for network traffic that traverses at least the network element and the first system at the second time, the network element automatically deactivating the security mechanism.

3. A method as recited in claim 1, wherein the step of activating the security mechanism comprises configuring the security mechanism to perform operations in relation to data packets that the network element is to forward toward the first system but not in relation to data packets that the network element is to forward toward a second system other than the first system.

4. A method as recited in claim 3, wherein the first system and the second system are separate computers.

5. A method as recited in claim 3, wherein the first system and the second system are separate network elements.

6. A method as recited in claim 3, wherein the first system and the second system are separate virtual systems on a particular computer.

7. A method as recited in claim 1, wherein the security mechanism is a firewall that is configured to perform the at least one of the one or more security functions for network traffic that traverses at least the network element and the first system.

8. An apparatus comprising:
    one or more processing devices;
    a network interface coupled to one or more of the processing devices and coupled to a network for receiving packet flows from the network;
    a policy controller coupled to one or more of the processing devices, the policy controller configured to determine, at a first time, that a first system other than the apparatus has stopped providing one or more security functions that were previously provided by the first system for network traffic that traverses at least the apparatus and the first system; and
    the policy controller configured to automatically activate, in response to a determination that the first system has stopped providing the one or more security functions, a security mechanism that provides at least one of the one or more security functions for network traffic that traverses at least the apparatus and the first system, wherein the security mechanism was in a state of deactivation in the apparatus prior to the first time;
    wherein the security mechanism is deactivated when the first system resumes providing the one or more security functions;
    wherein the security mechanism executes on at least one of the one or more processing devices while activated.

9. An apparatus as recited in claim 8, wherein the policy controller is further configured to perform:
    determining, at a second time that is later than the first time, whether the first system is currently providing the at least one of the one or more security functions for network traffic that traverses at least the apparatus and the first system; and
    in response to a determination that the first system is currently providing the at least one of the one or more security functions for network traffic that traverses at least the apparatus and the first system at the second time, automatically deactivating the security mechanism.

10. An apparatus as recited in claim 8, wherein the policy controller is configured to activate the security mechanism by configuring the security mechanism to perform operations in relation to data packets that the apparatus is to forward toward the first system but not in relation to data packets that the apparatus is to forward toward a second system other than the first system.

11. An apparatus as recited in claim 10, wherein the first system and the second system are separate computers.

12. An apparatus as recited in claim 10, wherein the first system and the second system are separate network elements.

13. An apparatus as recited in claim 10, wherein the first system and the second system are separate virtual systems on a particular computer.

14. An apparatus as recited in claim 8, wherein the security mechanism is a firewall that is configured to perform the at least one of the one or more security functions for network traffic that traverses at least the apparatus and the first system.

15. A non-transitory computer-readable storage storing one or more sequences of instructions, which instructions, when executed by one or more processors, cause the one or more processors to carry out steps comprising:
    determining, at a network element, at a first time, that a first system other than the network element has stopped providing one or more security functions that were previously provided by the first system for network traffic that traverses at least the network element and the first system; and
    in response to a determination that the first system has stopped providing the one or more security functions, the network element automatically activating a security mechanism that provides at least one of the one or more security functions for network traffic that traverses at least the network element and the first system, wherein the security mechanism was in a state of deactivation in the network element prior to the first time;
    wherein the security mechanism is deactivated when the first system resumes providing the one or more security functions;
    wherein the security mechanism is stored on the network element.

16. The computer-readable storage of claim 15, wherein the one or more instructions further cause the one or more processors to carry out steps comprising:
   determining, at the network element, at a second time that is later than the first time, whether the first system is currently providing the at least one of the one or more security functions for network traffic that traverses at least the network element and the first system; and
   in response to a determination that the first system is currently providing the at least one of the one or more security functions for network traffic that traverses at least the network element and the first system at the second time, the network element automatically deactivating the security mechanism.

17. The computer-readable storage of claim 15, wherein the step of activating the security mechanism comprises configuring the security mechanism to perform operations in relation to data packets that the network element is to forward toward the first system but not in relation to data packets that the network element is to forward toward a system other than the first system.

18. The computer-readable storage as recited in claim 17, wherein the first system and the second system are separate computers.

19. The computer-readable storage of claim 17, wherein the first system and the second system are separate network elements.

20. The computer-readable storage of claim 17, wherein the first system and the second system are separate virtual systems on a particular computer.

21. The computer-readable storage of claim 15, wherein the security mechanism is a firewall that is configured to perform the at least one of the one or more security functions for network traffic that traverses at least the network element and the first system.

* * * * *